INVENTOR
JOSEPH F. RANDO
ATTORNEY

June 17, 1969 J. F. RANDO 3,450,476
APPARATUS FOR MEASURING THE INDEX OF REFRACTION
OF A FLUID MEDIUM
Filed Feb. 3, 1966 Sheet 2 of 2

INVENTOR
JOSEPH F. RANDO
BY  *A. C. Smith*
ATTORNEY

United States Patent Office 3,450,476
Patented June 17, 1969

3,450,476
APPARATUS FOR MEASURING THE INDEX OF REFRACTION OF A FLUID MEDIUM
Joseph F. Rando, Los Altos, Calif., assignor to Hewlett-Packard Company, Palo Alto, Calif., a corporation of California
Filed Feb. 3, 1966, Ser. No. 524,720
Int. Cl. G01b 9/02
U.S. Cl. 356—107            10 Claims

ABSTRACT OF THE DISCLOSURE

An interferometer is provided with a plurality of different optical paths at least one of which passes in part through a medium having a known index of refraction and in part through a medium having an unknown index of refraction. One or more prisms of one of these media is mounted in at least this one optical path for movement between first and second positions to alter the ratio of the two parts of this one optical path by a selected amount and thereby produce a phase shift indicative of the unknown index of refraction.

---

This invention relates to apparatus for measuring the index of refraction of a fluid medium and has as its main object the provision of optical apparatus for more quickly and simply measuring the same with a high degree of accuracy.

This object is accomplished according to the illustrated embodiments of this invention by providing an interferometer with a selected numbed of optical paths, each of which includes a portion passing through a medium having an unknown index of refraction and another portion passing through a medium having a known index of refraction. As used herein the expression "a selected number of optical paths" is defined to include one or more optical paths. A prism of one of the media is disposed for movement partially through the selected number of optical paths between parallel prism paths of unequal length so as to alter by a selected amount the path-length ratio of the two portions of each of the selected number of optical paths and produce at the output of the interferometer a phase shift which is indicative of the unknown index of refraction.

Other and incidental objects of this invention will become apparent from a reading of this specification and an inspection of the accompanying drawing in which.

Figure 1:
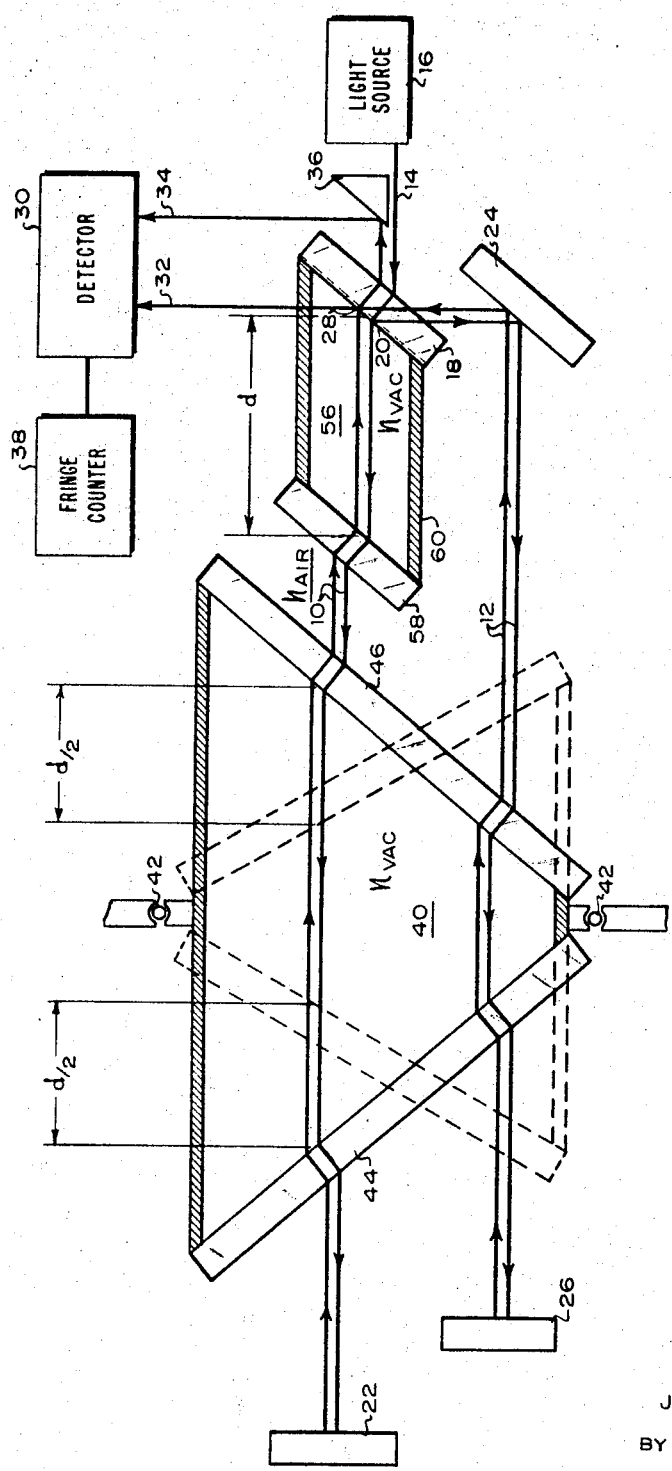
FIGURE 1 is a schematic representation of apparatus according to the preferred embodiment of this invention for measuring the index of refraction of a fluid medium.

Referring to FIGURE 1, there is shown an interferometer including first and second optical paths 10 and 12 of the same physical path length. Each of these optical paths passes through a fluid medium such as, for example, air having an unknown index of refraction $n_{air}$ which is to be measured. Circularly polarized light 14 is projected from a light source 16 such as a laser to an optically flat glass window 18 which serves as the input of the interferometer. A beam splitter 20 comprising a fifty percent mirror is formed on the back side of the glass window 18 so that one-half of the incident light 14 from the light source 16 is transmitted along the first optical path 10 and the other half is reflected along the second optical path 12. The light transmitted through the beam splitter 20 and along the first optical path 10 is reflected from a mirror 22 back to the beam splitter 20. The light reflected from the beam splitter 20 along the second optical path 12 is transmitted away from the first optical path 10 for a selected distance determined by the desired spacing between the first and second optical paths 10 and 12 to a mirror 24 which is oriented to project it in a direction parallel to the first optical path 10 to another mirror 26 from which it is similarly reflected back to the mirror 24 and thence to the beam splitter 20. Light reflected from the mirrors 22 and 26 back to the beam splitter 20 is combined to provide an interference pattern of fringes at the node 28 which serves as the output of the interferometer. This interference pattern of fringes is transmitted from the node 28 to the detector 30 along the optical paths 32 and 34, the latter of which is directed towards the detector 30 by the mirror 36. A fringe counter 38 such as a reversible counter is connected to the detector 30 for counting the number of fringes detected.

A prism 40 of a medium such as, for example, a vacuum having a known index of refraction $n_{vac}$ of 1 is mounted for rotational movement for a selected angle through both of the optical paths 10 and 12 as shown at 42. Since the light 14 from the light source 16 is circularly polarized the output intensity at node 28 is constant with angular rotation of the vacuum prism 40. If the interferometer were placed in the medium having the known index of refraction a prism of the medium having the unknown index of refraction to be measured would be used. The vacuum prism 40 of FIGURE 1 may be constructed, as shown in detail in FIGURE 2, by hermetically sealing a pair of optically flat glass windows 44 and 46 over the opposite ends of an evacuated cylindrical hole 48 which is formed between the converging faces 50 and 52 of a prismatic member 54. To insure that substantially all the incident light will be transmitted through the vacuum prism 40, this prismatic member 54 is constructed so that light passing through the glass windows 44 and 46 will enter the vacuum prism 40 at Brewster's angle. A vacuum prism constructed in this manner is well adapted for being either rotated or slid partially through one or both of the optical paths of an interferometer between parallel prism paths of substantially different length.

The unknown index of refraction $n_{air}$ is measured with the abovedescribed apparatus by initially rotating the vacuum prism 40 to the position indicated by the dashed lines in FIGURE 1 so that the path length through the vacuum prism 40 of the second optical path 12 is greater by the distance $d$ than that of the first optical path 10. Next, the fringe counter 38 is set to zero. The vacuum prism 40 is then rotated through one-hundred and eighty degrees to the position indicated by the solid lines in FIGURE 1. This has the effect of continuously increasing the path length through the vacuum prism 40 of the first optical path 10 while decreasing that of the second optical path 12 until the former is greater by the distance $d$ than the latter. Thus, for each of the first and second optical paths 10 and 12 the ratio of the path length through the vacuum to the path length through the air is altered by a selected amount and a corresponding phase shift in the interfering light waves is produced at the output node 28. This phase shift appears as a number of fringes which is directly proportional to the absolute value of the quantity ($n_{air}-n_{vac}$) or ($n_{air}-1$). These fringes are detected by the detector 30 and counted by the fringe counter 38 to provide a direct measure of the unknown index of refraction $n_{air}$. Though the vacuum prism 40 may be rotated through a lesser angle to obtain a reading, it is advantageous to rotate it through one-hundred and eighty degrees for the exact angle of rotation is then less critical since the number of fringes is relatively insensitive to rotation of the vacuum prism 40 at each end of this one-hundred and eighty degree range. The index of refraction is measured with a high degree of accuracy for the optical elements used because the effective changes in the optical path lengths of the first and second optical paths 10 and 12 are maximized for the optical elements used. This is accomplished by obtaining a large path length difference $d$ between the first and second optical paths 10 and 12 through the vacuum prism 40 and by rotating the vacuum prism 40 for a selected angle through both of the optical paths 10 and 12 so as to increase the optical path of one while decreasing the optical path of the other.

Changes in the ambient pressure and temperature cause the index of refraction $n_{air}$ being measured to change. These changes in the index of refraction $n_{air}$ may be continuously monitored without further rotation of the vacuum prism 40 by including in the first optical path 10 a vacuum cylinder 56 having a physical path length $d$ equal to the path length difference $d$ between first and second optical paths 10 and 12 through the vacuum prism 40. By including this vacuum cylinder 56 only in the first optical path 10, the changes caused in the number of fringes by changes in the ambient pressure and temperature are related to changes in the index of refraction $n_{air}$ by the same constant of proportionality that relates the index of refraction $n_{air}$ to the number of fringes produced during rotation of the vacuum prism 40 partially through both of the optical paths 10 and 12. The vacuum cylinder 56 may be constructed by hermetically sealing the glass window 18 and another glass window 58 over the opposite ends of an evacuated cylinder 60. The two major surfaces of each of these glass windows 18 and 58 as well as those of the glass windows 44 and 46 used to construct the vacuum prism 40 are made parallel to each other so that the glass windows displace the transmitted light without contributing to its deflection.

With the above-described apparatus the unknown index of refraction $n_{air}$ may be quickly measured and continuously monitored for changes since no pumping is required to evacuate or fill a chamber for altering the optical path lengths of the first and second optical paths 10 and 12 as is commonly required with conventional apparatus. Concomitantly, no time delay is required for the apparatus to attain a state of thermal equilibrium because of this absence of pumping and other such sources of heat. The unknown index of refraction is continuously measured simply by setting the fringe counter 38 initially to zero and rotating the vacuum prism 40 through a selected angle.

Figure 3:
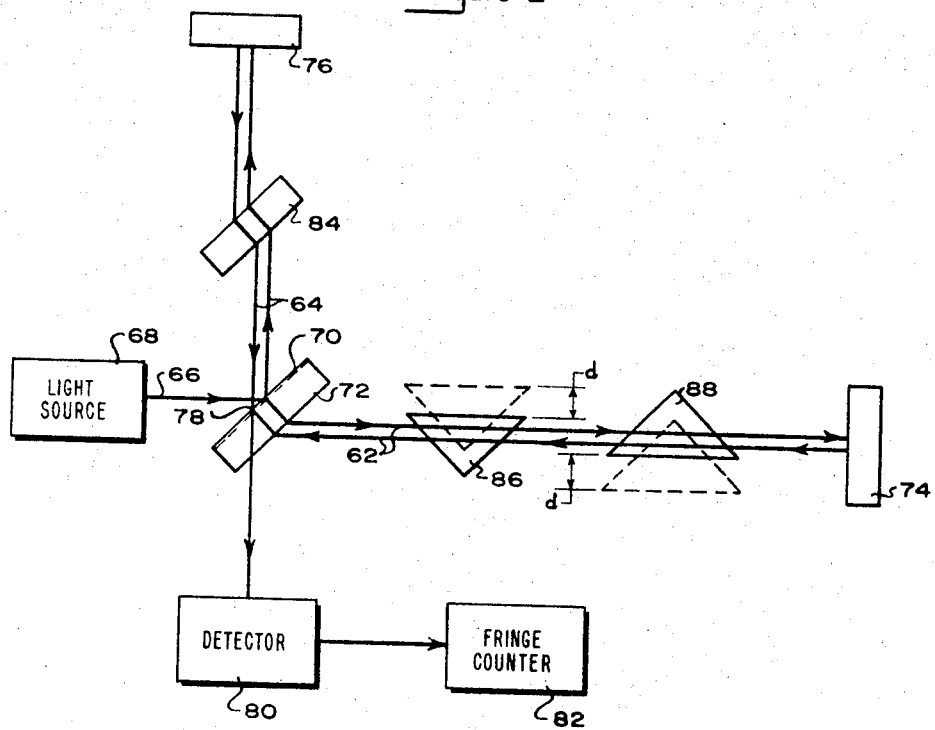
FIGURE 3 is a schematic representation of apparatus according to another embodiment of this invention for measuring the index of refraction of a fluid medium.

Referring now to FIGURE 3, there is shown disposed in a fluid medium such as air, the index of refraction $n_{air}$ of which is to be measured, an interferometer including first and second optical paths 62 and 64 of the same physical path length. Light 66 is projected from a light source 68 to a beam splitter 70 comprising a fifty percent mirror formed on the front side of an optically flat glass window 72. The light transmitted through the beam splitter 70 and along the first optical path 62 is reflected from a mirror 74 back to the beam splitter 70. Similarly, the light reflected from the beam splitter 70 and transmitted along the second optical path 64 is reflected from a mirror 76 back to the beam splitter 70 where it is combined with the light reflected from mirror 74 to form an interference pattern of fringes at the node 78. These fringes are detected by a detector 80 which is optically coupled to node 78 and are counted by a fringe counter 82 which is connected to the detector 80. The second optical path 64 includes an optically flat glass compensating plate 84 which has the same optical properties as the glass in the optical path 62 and which additionally serves to make the path length through glass the same in both of the optical paths 62 and 64.

Figure 2:
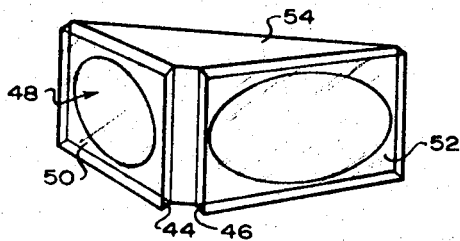
FIGURE 2 is a perspective view showing in detail the construction of the prism of FIGURE 1.

A pair of vacuum prisms 86 and 88, such as the one shown in detail in FIGURE 2, are slidably mounted for movement in opposite directions partially through the first optical path 62. These vacuum prisms 86 and 88 are initially placed in the positions indicated by the dashed lines in FIGURE 3. After setting the fringe counter 82 to zero, the vacuum prisms 86 and 88 are each moved in opposite directions a distance $d$ partially through the first optical path 62 to the positions indicated by the solid lines in FIGURE 3. By moving the vacuum prisms 86 and 88 in this manner, the optical path length of the first optical path 62 is changed while the light transmitted along the first optical path 62 remains undeflected in angle. The number of fringes counted by the fringe counter 82 for the displacement $d$ of the two vacuum prisms 86 and 88 through the first optical path 62 is directly proportional to the absolute value of the quantity ($n_{air}-n_{vac}$) or ($n_{air}-1$).

I claim:

1. Apparatus for measuring the index of refraction of a medium, said apparatus comprising:
   an interferometer having an input, an output, and means for producing a plurality of optical paths defined between said input and said output and for combining said optical paths at said output, each of a selected number of said optical paths including a portion which passes through a medium having an index of refraction to be measured and another portion which passes through a medium having a known index of refraction; and
   a prism of one of said media being disposed for movement partially through said selected number of optical paths between parallel prism paths of unequal length to alter the path-length ratio of said portions by a selected amount for each of said selected number of optical paths and produce at the output of said interferometer a corresponding phase shift which is indicative of the index of refraction to be measured.

2. Apparatus as in claim 1 including means for confining said prism and imparting said movement thereto, said means having a pair of optically flat windows disposed in said selected number of optical paths at a selected angle with respect to one another.

3. Apparatus as in claim 2 wherein said selected number includes at least two.

4. Apparatus as in claim 3 including additional means for fixedly confining a body of said one medium in one of said two optical paths, the path length of said one optical path through said body being related to the difference in path length through said prism between said two optical paths.

5. Apparatus as in claim 4 wherein said means for confining said prism is rotatably supported for rotating said prism a selected angle through said two optical paths.

6. Apparatus as in claim 1 wherein said selected number includes at least one.

7. Apparatus as in claim 6 including another prism of said one medium, said prisms being slidably supported for movement from opposite directions partially through said one optical path.

8. Apparatus as in claim 7 including means for confining said prisms and having for each of said prisms a pair of optically flat windows disposed in said one optical path at a selected angle with respect to one another.

9. Apparatus as in claim 1 wherein said selected number comprises two, said apparatus including additional means for fixedly confining a body of said one medium in one of said two optical paths, the path length of said one optical path through said body being equal to the difference in path length through said prism between said two optical paths.

10. Apparatus as in claim 1 wherein said selected number comprises two and said prism is rotatably supported for rotating a selected angle through said two optical paths.

References Cited

UNITED STATES PATENTS

| | | |
|---|---|---|
| 2,413,208 | 12/1946 | Barnes. |
| 2,612,814 | 10/1952 | Glasser. |
| 2,795,991 | 6/1957 | Tuzi. |
| 2,880,644 | 4/1959 | Brockway et al. |
| 3,109,049 | 10/1963 | Williams. |

RONALD L. WIBERT, *Primary Examiner.*

T. MAJOR, *Assistant Examiner.*

U.S. Cl. X.R.

356—134